United States Patent
Zhang

(10) Patent No.: US 11,461,509 B2
(45) Date of Patent: Oct. 4, 2022

(54) SCREEN CONTROL METHOD AND TERMINAL

(71) Applicant: HUAWEI TECHNOLOGIES CO., LTD., Guangdong (CN)

(72) Inventor: Yuxi Zhang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 215 days.

(21) Appl. No.: 16/642,545

(22) PCT Filed: Aug. 30, 2017

(86) PCT No.: PCT/CN2017/099769
§ 371 (c)(1),
(2) Date: Feb. 27, 2020

(87) PCT Pub. No.: WO2019/041192
PCT Pub. Date: Mar. 7, 2019

(65) Prior Publication Data
US 2020/0372189 A1 Nov. 26, 2020

(51) Int. Cl.
*G06F 21/84* (2013.01)
*G06F 1/3206* (2019.01)
(Continued)

(52) U.S. Cl.
CPC ............ *G06F 21/84* (2013.01); *G06F 1/3206* (2013.01); *G06F 3/04883* (2013.01);
(Continued)

(58) Field of Classification Search
CPC .... G06F 21/84; G06F 1/3206; G06F 3/04883; G06F 21/32; G06F 2221/2149;
(Continued)

(56) References Cited

U.S. PATENT DOCUMENTS

| | | | |
|---|---|---|---|
| 2004/0208348 A1* | 10/2004 | Baharav | G06F 3/0421 382/124 |
| 2004/0218788 A1* | 11/2004 | Geng | G06V 40/10 382/118 |

(Continued)

FOREIGN PATENT DOCUMENTS

| | | |
|---|---|---|
| CN | 102629183 A | 8/2012 |
| CN | 102779502 A | 11/2012 |

(Continued)

OTHER PUBLICATIONS

Hoto Cocoa, What are some little-known tricks for using Apple Watch?, https://www.zhihu.com/question/54403927, Jun. 21, 2017, 39 pages.

*Primary Examiner* — Darren B Schwartz
(74) *Attorney, Agent, or Firm* — Womble Bond Dickinson (US) LLP

(57) ABSTRACT

A screen control method and a terminal. The method is applied to a terminal that has a touchscreen and a screen fingerprint sensor. The method includes: when the touchscreen is in a lighted state, receiving, by the terminal, a first touch operation; obtaining, by the terminal, texture information and touch information of the first touch operation by using the touchscreen and the screen fingerprint sensor, where the texture information is skin texture information corresponding to the first touch operation, and the touch information includes at least one of a touch position and a touch area; and turning off, by the terminal, the touchscreen based on the texture information and the touch information.

18 Claims, 12 Drawing Sheets

(51) Int. Cl.
*G06F 3/04883* (2022.01)
*G06F 21/32* (2013.01)
*G06V 40/10* (2022.01)
*G06V 40/12* (2022.01)
*G06V 40/16* (2022.01)
*G06F 3/041* (2006.01)
*G06F 3/048* (2013.01)
*G06F 3/04886* (2022.01)

(52) U.S. Cl.
CPC .............. *G06F 21/32* (2013.01); *G06V 40/10* (2022.01); *G06V 40/12* (2022.01); *G06V 40/1365* (2022.01); *G06V 40/1376* (2022.01); *G06V 40/16* (2022.01); *G06F 2221/2149* (2013.01)

(58) Field of Classification Search
CPC ...... G06F 3/041; G06F 3/048; G06F 3/04886; G06F 21/316; G06V 40/10; G06V 40/12; G06V 40/1365; G06V 40/1376; G06V 40/16
See application file for complete search history.

(56) References Cited

U.S. PATENT DOCUMENTS

| | | | | |
|---|---|---|---|---|
| 2006/0062438 | A1* | 3/2006 | Rowe | G06V 40/1388 382/124 |
| 2008/0253626 | A1* | 10/2008 | Shuckers | G06V 40/1382 382/125 |
| 2008/0285813 | A1* | 11/2008 | Holm | G06V 40/10 382/115 |
| 2009/0169070 | A1* | 7/2009 | Fadell | G06F 21/32 382/124 |
| 2010/0093311 | A1* | 4/2010 | Ide | G06F 3/044 455/411 |
| 2012/0235790 | A1* | 9/2012 | Zhao | H04W 12/065 340/5.83 |
| 2013/0335372 | A1* | 12/2013 | Wu | G06F 3/0446 345/174 |
| 2014/0104436 | A1* | 4/2014 | Bork | H04N 17/00 348/184 |
| 2014/0133714 | A1* | 5/2014 | Ivanov | G06V 40/13 382/124 |
| 2016/0140379 | A1* | 5/2016 | Pedersen | G06V 40/13 726/19 |
| 2016/0364564 | A1* | 12/2016 | Lee | G06F 3/0484 |
| 2017/0046556 | A1* | 2/2017 | Kim | G06F 3/0416 |
| 2017/0177847 | A1* | 6/2017 | Shi | G06V 40/70 |
| 2017/0277874 | A1* | 9/2017 | Lee | G06F 3/041 |
| 2017/0316250 | A1* | 11/2017 | Roh | G06F 21/32 |
| 2018/0253581 | A1* | 9/2018 | Zhang | G06V 10/751 |
| 2020/0202105 | A1* | 6/2020 | Zhang | H04M 1/7243 |

FOREIGN PATENT DOCUMENTS

| | | |
|---|---|---|
| CN | 104793878 A | 7/2015 |
| CN | 106527949 A | 3/2017 |
| CN | 106569586 A | 4/2017 |
| CN | 106681640 A | 5/2017 |
| CN | 107103223 A | 8/2017 |
| EP | 3588341 A1 | 1/2020 |
| JP | 2011216066 A | 10/2011 |

* cited by examiner (a)          (b)

(a)          (b)

(a)                        (b)

SCREEN CONTROL METHOD AND TERMINAL

CROSS REFERENCE TO RELATED APPLICATIONS

This application is a national stage of International Application No. PCT/CN2017/099769, filed on Aug. 30, 2017, which is hereby incorporated by reference in its entirety.

TECHNICAL FIELD

Embodiments of the present invention relate to communications technologies, and in particular, to a screen control method and a terminal.

BACKGROUND

With the development of electronic technologies, mobile terminals such as a mobile phone and a tablet computer have increasingly more functions, and further consume increasingly high battery power. To enhance a battery life of the terminal, power consumption of the terminal can be reduced as much as possible. In the prior art, there are a plurality of methods for reducing the power consumption of the terminal by using software or hardware. Reducing a screen-on time of a terminal screen is a relatively effective manner for reducing the power consumption.

In the prior art, a user may control a screen to turn off by setting an automatic locking duration. After the automatic locking duration of inactivity, the screen of the terminal is turned off automatically. In a screen-on state, when the user wants to turn off the screen of the terminal immediately, the user can press a power button to turn off the screen. However, for some large-screen mobile phones or in some scenarios, it is inconvenient for the user to operate the power button, and therefore the operation of turning off the terminal screen is not convenient enough.

SUMMARY

Embodiments of the present invention provide a screen control method and a terminal, which can improve convenience of turning off a screen.

According to a first aspect, an embodiment of the present invention provides a screen control method. The method is applied to a terminal that has a touchscreen and a screen fingerprint sensor. The terminal may obtain, by using the touchscreen and the screen fingerprint sensor, biometric texture information of a touch operation that is input by using the touchscreen. The method includes: when the touchscreen is in a lighted state, receiving, by the terminal, a first touch operation by using the touchscreen; obtaining, by the terminal, texture information and touch information of the first touch operation by using the touchscreen and the screen fingerprint sensor, where the texture information is skin texture information corresponding to the first touch operation, and the touch information includes at least one of a touch position, a touch area, and a touch duration; and turning off, by the terminal, the touchscreen based on the texture information and the touch information. That the touchscreen is in a lighted state may include a plurality of states. For example, the touchscreen is in a screen-on and unlocked state; or the touchscreen is in a screen-on and locked state.

In one embodiment, when the touch information includes the touch position, the turning off, by the terminal, the touchscreen based on the texture information and the touch information may specifically include: when the texture information does not match preset texture information, and at least one part of the touch position is in a preset area, turning off, by the terminal, the touchscreen; and the preset area is a part of an area on the touchscreen. Therefore, a user may touch a specific position on the touchscreen by using a body part (for example, a palm) whose texture information is not pre-enrolled, so that the screen can be quickly turned off. Further, when determining, based on the texture information and the touch information, whether to turn off the touchscreen, the terminal may further consider moving track information of the terminal. For example, when the texture information does not match preset texture information, at least one part of the touch position is in a preset area, and the moving track information indicates that the terminal is put down, the terminal turns off the touchscreen. The terminal may obtain the moving track information of the terminal by using components such as a gyroscope and an acceleration sensor in the terminal.

In one embodiment, when the touch information includes the touch area, and the turning off, by the terminal, the touchscreen based on the texture information and the touch information may specifically include: when the texture information does not match preset texture information, and the touch area is greater than or equal to a preset threshold, turning off, by the terminal, the touchscreen. Therefore, a user may touch the touchscreen in a large area by using a body part (for example, a palm) whose texture information is not pre-enrolled, so that the screen can be quickly turned off. Further, when determining, based on the texture information and the touch information, whether to turn off the touchscreen, the terminal may further consider moving track information of the terminal. For example, when the texture information does not match preset texture information, the touch area is greater than or equal to a preset threshold, and the moving track information indicates that the terminal is put down, the terminal turns off the touchscreen.

In one embodiment, the touch information may include both a touch position and a touch area, and the turning off, by the terminal, the touchscreen based on the texture information and the touch information may specifically include: when the texture information does not match preset texture information, at least one part of the touch location is in a preset area, and the touch area is greater than or equal to a preset threshold, turning off, by the terminal, the touchscreen. Therefore, a user may touch a specific position on the touchscreen in a large area by using a body part (for example, a palm) whose texture information is not pre-enrolled, so that the screen can be quickly turned off. Further, moving track information of the terminal may be further considered. For example, when the texture information does not match preset texture information, at least one part of the touch position is in a preset area, the touch area is greater than or equal to a preset threshold, and the moving track information indicates that the terminal is put down, the terminal turns off the touchscreen.

In one embodiment, the touch information may include a touch duration, and the turning off, by the terminal, the touchscreen based on the texture information and the touch information may specifically include: when the texture information does not match preset texture information, and the touch duration is greater than or equal to a length of a preset time period, turning off, by the terminal, the touchscreen. Therefore, a user may touch a specific position on the touchscreen for a long time by using a body part (for example, a palm) whose texture information is not pre-enrolled, so that the screen can be quickly turned off. Further, as shown in the foregoing, moving track information of the terminal may also be considered. When the texture information does not match preset texture information, the touch time duration is greater than or equal to a length of a preset time period, and the moving track information indicates that the terminal is put down, the terminal turns off the touchscreen.

The preset area may be in a middle position of the touchscreen. Alternatively, the preset area may be at an upper part, a lower part, a left part, or a right part of the touchscreen. The skin texture information is at least one type of the following information: fingerprint information, palm print information, and finger texture information.

According to a second aspect, an embodiment of the present invention provides a screen control method. The method is applied to a terminal that has a touchscreen and a screen fingerprint sensor. The method includes: when the terminal is in a call state, receiving, by the terminal, a first touch operation by using the touchscreen; obtaining, by the terminal, texture information of the first touch operation by using the touchscreen and the screen fingerprint sensor, where the texture information is skin texture information corresponding to the first touch operation; and if the texture information matches preset texture information, turning off, by the terminal, the touchscreen. The skin texture information is at least one type of the following information: ear texture information and face texture information. In this embodiment, when a user places a terminal near an ear to make a call, the terminal may detect ear texture information or face texture information of the user, so that the screen may be automatically turned off, thereby preventing a false touch and saving power. Therefore, an optical proximity sensor in the prior art can be replaced, thereby saving a component for the terminal.

Further, after the turning off, by the terminal, the touchscreen, the method further includes: if the terminal learns, by using the touchscreen, that an object that inputs the first touch operation leaves the touchscreen, in other words, the terminal learns that an ear or a face of the user leaves the touchscreen, lighting up, by the terminal, the touchscreen. Therefore, an optical proximity sensor in the prior art may be replaced, so that a screen is automatically lighted up when a user removes the terminal away from an ear.

That the terminal is in a call state includes a plurality of states: a state in which the terminal dials a called number and a call is not connected; and a state in which the terminal, as a called party or a calling party, has established a call connection to a peer end. The ear texture information includes one or more types of the following data: an ear texture, an ear shape, and an ear size. The face texture information includes one or more types of the following data: a face texture, a face shape, and a face size.

According to a third aspect, an embodiment of the present invention provides a terminal. The terminal includes: a touchscreen; a screen fingerprint sensor, where the screen fingerprint sensor is integrated into the touchscreen, or the screen fingerprint sensor is below the touchscreen; one or more processors; and one or more memories, where the one or more memories store one or more computer programs, the one or more computer programs include an instruction, and when the instruction is executed by the terminal, the terminal is enabled to perform any method in the foregoing first aspect.

According to a fourth aspect, an embodiment of the present invention provides a terminal. The terminal includes: a touchscreen; a screen fingerprint sensor, where the screen fingerprint sensor is integrated into the touchscreen, or the screen fingerprint sensor is below the touchscreen; one or more processors; and one or more memories, where the one or more memories store one or more computer programs, the one or more computer programs include an instruction, and when the instruction is executed by the terminal, the terminal is enabled to perform any method in the foregoing second aspect.

According to a fifth aspect, an embodiment of the present invention provides a terminal. The units included in the terminal are configured to perform the methods in the first aspect or the second aspect, and the units may be implemented by using hardware or software.

According to a sixth aspect, an embodiment of the present invention provides a screen control apparatus included in a terminal. The apparatus has a function of implementing the action of the terminal in the methods according to the first aspect or the second aspect. The function may be implemented by hardware, or may be implemented by hardware executing corresponding software. The hardware or software includes one or more modules or units that correspond to the foregoing function.

According to a seventh aspect, an embodiment of the present invention provides a computer program product that includes an instruction. When the computer program product is run on an electronic device, the electronic device is enabled to perform the method described in the first aspect or the second aspect.

According to an eighth aspect, an embodiment of the present invention provides a computer readable storage medium that includes an instruction. When the instruction is run on an electronic device, the electronic device is enabled to perform the method described in the first aspect or the second aspect.

According to a ninth aspect, an embodiment of the present invention further provides a data processing system, including modules configured to perform the methods provided in the first aspect or the second aspect.

DESCRIPTION OF EMBODIMENTS

Screen control methods provided in embodiments of the present invention may be applied to various terminals that have a touchscreen, and the terminal includes a screen fingerprint sensor. For example, the terminal may be: a mobile phone, a tablet computer, a laptop computer, a digital camera, a personal digital assistant (PDA for short), a navigation apparatus, a mobile Internet apparatus (MID), a wearable device, or the like.

Figure 1:
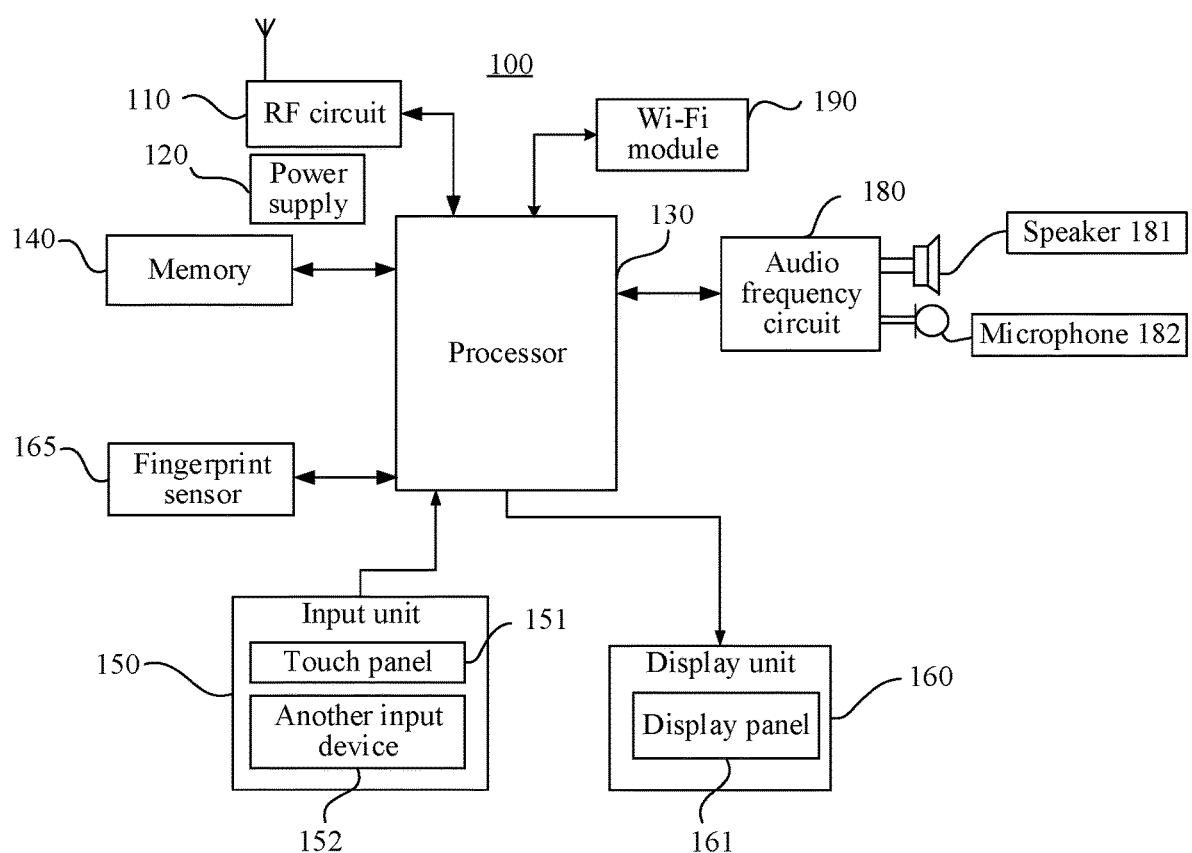
FIG. 1 is a block diagram of a partial structure of a terminal according to an embodiment of the present invention.

FIG. 1 is a block diagram of a partial structure of a terminal according to an embodiment of the present invention. The terminal is described by using a mobile phone 100 as an example. Referring to FIG. 1, the mobile phone 100 includes: a radio frequency (RF) circuit 110, a power supply 120, a processor 130, a memory 140, an input unit 150, a display unit 160, a fingerprint sensor 165, a sensor 170, an audio circuit 180, a wireless fidelity (Wi-Fi) module 190, and the like. A person skilled in the art may understand that, the structure of the mobile phone shown in the FIG. 1 does not constitute a limitation on the mobile phone. The mobile phone may include more or fewer components than those shown in the figure, combine some components, or have different component arrangements.

Each constituent component of the mobile phone 100 is described in detail below with reference to FIG. 1.

The RF circuit 110 may be configured to receive and send information or receive and send a signal in a call process. For example, the RF circuit 110 may send downlink data received from a base station to the processor 130 for processing, and send uplink data to the base station. Generally, the RF circuit includes but is not limited to an RF chip, an antenna, at least one amplifier, a transceiver, a coupler, a low noise amplifier (LNA), a duplexer, a radio frequency switch, and the like. In addition, the RF circuit 110 may further perform wireless communication with a network device and another device. Any communications standard or protocol may be used for the wireless communication, including but not limited to global system for mobile communications (GSM), general packet radio service (GPRS), code division multiple access (CDMA), wideband code division multiple access (WCDMA), long term evolution (LTE), an email, short messaging service (SMS), and the like.

The memory 140 may be configured to store a software program and a module. The processor 130 executes various functional applications of the mobile phone 100 and data processing by running the software program and the module stored in the memory 140. The memory 140 may mainly include a program storage area and a data storage area. The program storage area may store an operating system, an application program required by at least one function (such as an audio playback function and an image playback function), and the like. The data storage area may store data (such as audio data and a phone book) that is created based on use of the mobile phone 100, and the like. In addition, the memory 140 may include a high-speed random access memory, or may further include a non-volatile memory, such as at least one magnetic disk storage device, a flash storage device, or another volatile solid-state storage device.

The input unit 150 may be configured to: receive input digit or character information, and generate key-signal input related to user settings and function control of the mobile phone 100. Specifically, the input unit 150 may include a touch panel 151 and another input device 152. The touch panel 151, also referred to as a touchscreen, may collect a touch operation performed by a user on or near the touch panel 151 (for example, an operation performed on or near the touch panel 151 by the user by using a finger, or any suitable object or accessory such as a stylus), and drive a corresponding connected apparatus according to a preset program. In one embodiment, the touch panel 151 may include two parts: a touch detection apparatus and a touch controller. The touch detection apparatus detects a touch direction of a user, detects a signal brought by a touch operation, and transmits the signal to the touch controller. The touch controller receives touch information from the touch detection apparatus, converts the touch information into contact coordinates, sends the contact coordinates to the processor 130, and can receive a command sent by the processor 130 and execute the command. In addition, the touch panel 151 may be implemented in a plurality of types, such as a resistive type, a capacitive type, an infrared type, and a surface acoustic wave type. In addition to the touch panel 151, the input unit 150 may further include another input device 152. Specifically, the another input device 152 may include but is not limited to one or more of a physical keyboard, a function key (such as a volume control key or a switch key), a trackball, a mouse, and a joystick.

The display unit 160 may be configured to display information input by the user or information provided for the user and various menus and interfaces of the mobile phone 100. The display unit 160 may include a display panel 161. Optionally, the display panel 161 may be configured in a form of a liquid crystal display (LCD for short), an organic light-emitting diode (OLED for short), an active-matrix organic light emitting diode (AMOLED for short) panel, or the like. Further, the touch panel 151 may cover the display panel 161. After detecting a touch operation on or near the touch panel 151, the touch panel 151 transmits the touch operation to the processor 130 to determine a touch event type. Then, the processor 130 provides corresponding visual output on the display panel 161 based on the touch event type. Although, in FIG. 1, the touch panel 151 and the display panel 161 are used as two separate parts to implement input and output functions of the mobile phone 100, in some embodiments, the touch panel 151 and the display panel 161 may be integrated to implement the input and output functions of the mobile phone 100.

A fingerprint sensor 165 may collect or recognize a fingerprint of a user, and may further collect or recognize a palm pattern of a palm and textures different from the fingerprint in the finger. The fingerprint sensor 165 in this embodiment of the present invention is a screen fingerprint sensor. The screen fingerprint sensor refers to: The fingerprint sensor 165 may be integrated with the touch panel 151 or the display panel 161, or the fingerprint sensor 165 may be below the touch panel 151 or the display panel 161. By using the touch panel 151 and the fingerprint sensor 165, when the user touches the touch panel 151, the skin texture of the touch part may be collected or recognized. For example, an OLED screen can cooperate with a fingerprint sensor to provide a technical competence of inducing a biological feature such as a fingerprint and a skin texture. For example, a process of recognizing a fingerprint on a screen may be: When skin (for example, a finger) of the user is pasted on a surface of the screen, a picture capturing process is triggered. An OLED light emitting layer acts as a light emitting source. The light is reflected on a surface of a finger, and the reflected light is filtered and collimated by a lens, and then may be collected by the fingerprint sensor. A photoelectric detection unit of each pixel converts the received optical signal into a gray image. Then, matching is performed on the gray image to implement fingerprint or texture recognition. Alternatively, the fingerprint sensor may be integrated into an AMOLED screen.

The mobile phone 100 may further include at least one sensor 170, for example, an optical sensor, a motion sensor, or another sensor. In one embodiment, the optical sensor may include an ambient light sensor and a proximity sensor. The ambient light sensor may adjust luminance of the display panel 161 based on brightness of ambient light. The proximity sensor may turn off the display panel 161 and/or backlight when the mobile phone 100 moves near an ear. As a motion sensor, an accelerometer sensor may detect acceleration values in all directions (usually on three axes), may detect a value and a direction of gravity when the accelerometer sensor is stationary, and may be applied to an application to recognize a mobile phone posture (for example, screen switching between a landscape mode and a portrait mode, a related game, and magnetometer posture calibration), a function related to vibration recognition (such as a pedometer and a knock), and the like. Other sensors such as a gyroscope, a barometer, a hygrometer, a thermometer, or an infrared sensor that may be further configured in the mobile phone 100. Details are not described in detail herein.

An audio frequency circuit 180, a loudspeaker 181, and a microphone 182 may provide audio interfaces between the user and the mobile phone 100. The audio frequency circuit 180 may transmit, to the loudspeaker 181, an electrical signal converted from received audio data. The loudspeaker 181 converts the electrical signal into an audio signal and outputs the audio signal. In addition, the microphone 182 converts the collected audio signal into an electrical signal. The audio frequency circuit 180 receives the electrical signal, converts the electrical signal into audio data, and then outputs the audio data to the RF circuit 110, to send the audio data to another mobile phone, or outputs the audio data to the memory 140 for further processing.

Wi-Fi, infrared, and Bluetooth are all short-distance wireless transmission technologies. The mobile phone 100 may help, by using a Wi-Fi module 190, the user to send and receive an email, browse a web page, access streaming media, and the like, which provides wireless broadband Internet access for the user. The mobile phone 100 may transmit an infrared light to the outside within a certain range by using an infrared transmitter 192. The mobile phone may communicate with an external device by using a Bluetooth module 194.

The processor 130 is a control center of the mobile phone 100, is connected to each part of the entire mobile phone 100 by using various interfaces and lines, and performs various functions of the mobile phone 100 and data processing, by running or executing the software program and/or the module that is stored in the memory 140 and by invoking data stored in the memory 140, to implement a plurality of services that are based on the mobile phone. Optionally, the processor 130 may include one or more processing units. Preferably, an application processor and a modem processor may be integrated into the processor 130. The application processor mainly processes an operating system, a user interface, an application program, and the like. The modem processor mainly processes wireless communication. It may be understood that the modem processor may not be integrated into the processor 130.

In one embodiment of the present invention, the processor 130 may execute the program instruction stored in the memory 140, to enable the mobile phone to perform the method shown in any one of the following embodiments.

The mobile phone 100 further includes a power supply 120 (such as a battery) that supplies power to the components. Preferably, the power supply may be logically connected to the processor 130 by using a power supply management system, so that functions such as charging, discharging, and power consumption management are implemented by using the power supply management system.

With reference to the accompanying drawings, the following describes in detail a screen control method provided in one embodiment of the present invention.

Figure 2:
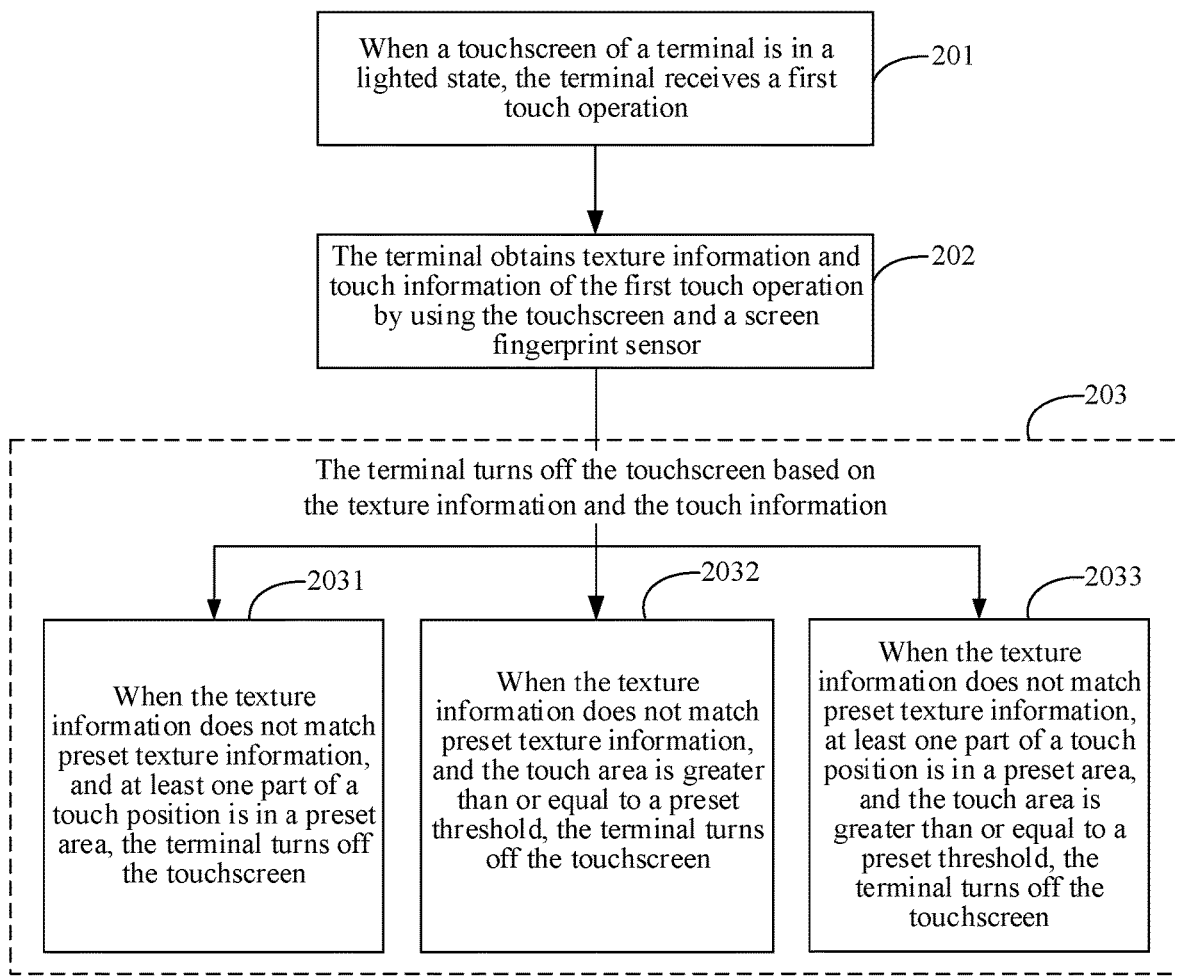
FIG. 2 is a schematic diagram of a screen control method according to an embodiment of the present invention.

FIG. 2 is a schematic diagram of a screen control method according to an embodiment of the present invention. The methods provided in the embodiments of the present invention are applied to terminals that have a touchscreen, and the terminal includes a screen fingerprint sensor. In other words, the terminal may collect and recognize skin texture information of a user when the user touches the screen. The skin texture information includes one or more types of the following information: fingerprint information, palm print information, finger texture information, ear texture, face texture, and the like. The finger texture information may be information of one or more fingers, may include fingerprint information of a fingertip and textures of a finger rather than a fingerprint, and may also include only the textures of a finger rather than a fingerprint. As shown in FIG. 2, the method includes the following operation.

Operation 201: When the touchscreen is in a lighted state, the terminal receives a first touch operation.

That the touchscreen is in a lighted state means that the touchscreen is in a screen-on state. In the screen-on state, all or some areas of the touchscreen may support a touch interaction operation. For example, the user may light up a touchscreen of a terminal by pressing a power key or an unlocking key, or when a terminal receives an unlocking operation in any form, the screen may be lighted up, or when a terminal receives a notification message, receives an incoming call, or an alarm clock reminder is triggered, the terminal lights up the screen. The user may perform a touch operation on the lighted touchscreen, and all or some areas of the touchscreen may receive and recognize the touch operation of the user.

Operation 202: The terminal obtains texture information and touch information of the first touch operation by using the touchscreen and the screen fingerprint sensor.

When receiving the first touch operation, the terminal may obtain, by using the screen fingerprint sensor or by using the screen fingerprint sensor and the touchscreen, the skin texture information corresponding to the first touch operation. The skin texture information may include a fingerprint, a palm print, and texture information rather than the fingerprint. In addition, the terminal may further obtain touch information of the first touch operation. The touch information includes a touch position of the first touch operation on the touchscreen, or includes a touch area of the first touch operation on the touchscreen, or includes the touch position and the touch area.

Operation 203: The terminal turns off the touchscreen based on the texture information and the touch information. Specifically, based on different pieces of touch information, step 203 may have the following different execution manners.

When the touch information includes the touch position, operation 203 may include operation 2031.

Operation 2031: When the texture information does not match preset texture information, and at least one part of the touch position is in a preset area, the terminal turns off the touchscreen. The preset area is a part of an area on the touchscreen.

Figure 3A:
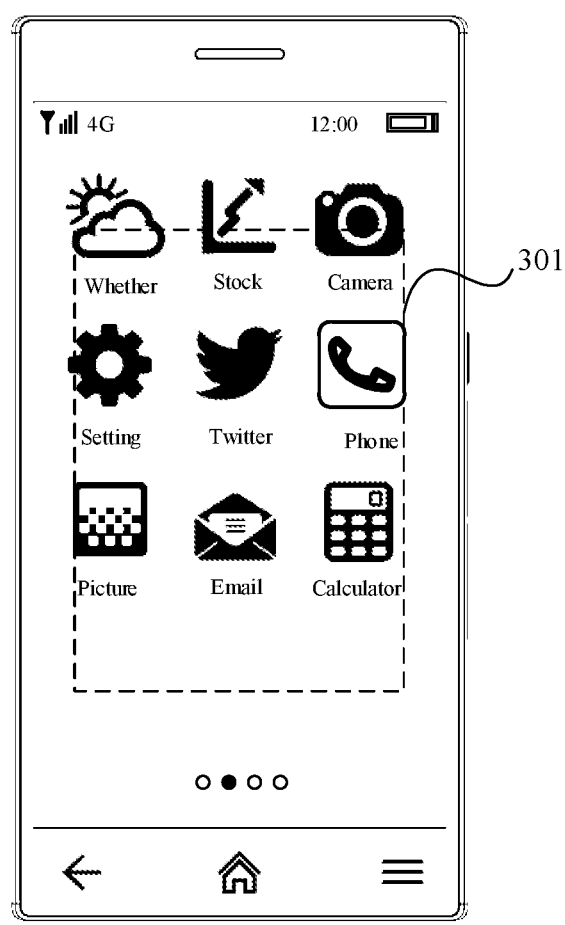
FIG. 3A to FIG. 3E are schematic diagrams of a preset area according to an embodiment of the present invention.

The user may pre-enroll a frequently used fingerprint into the terminal. For example, the user may pre-enroll fingerprints of all fingers that are to be used in the touch operation into the terminal, and use the fingerprints as preset texture information. For example, when the user frequently operates the terminal by using a thumb, an index finger, and a middle finger, fingerprints of the thumb, the index finger, and the middle finger of a left hand and a right hand may be pre-enrolled. A part of the touchscreen may be preset as the preset area. As shown in FIG. 3A, a preset area 301 may be in a middle position of the touchscreen. Alternatively, referring to FIG. 3B, FIG. 3C, FIG. 3D, and FIG. 3E, a preset area 301 may also be separately at an upper part, a lower part, a left part, or a right part of the touchscreen. When the user wants to turn off the touchscreen, the user may touch the preset area by using a body part that is different from the body part whose fingerprint is pre-enrolled. The body part that is different from the body part whose fingerprint is pre-enrolled may be, for example, a body part, in the finger, rather than the body part whose fingerprint is enrolled, may be a finger whose fingerprint is not enrolled, and may also be a palm or a combination of a palm and a finger. It should be noted that a case in which the texture information does not match preset texture information includes: The texture information does not match the preset texture information completely or partially.

Figure 3B:
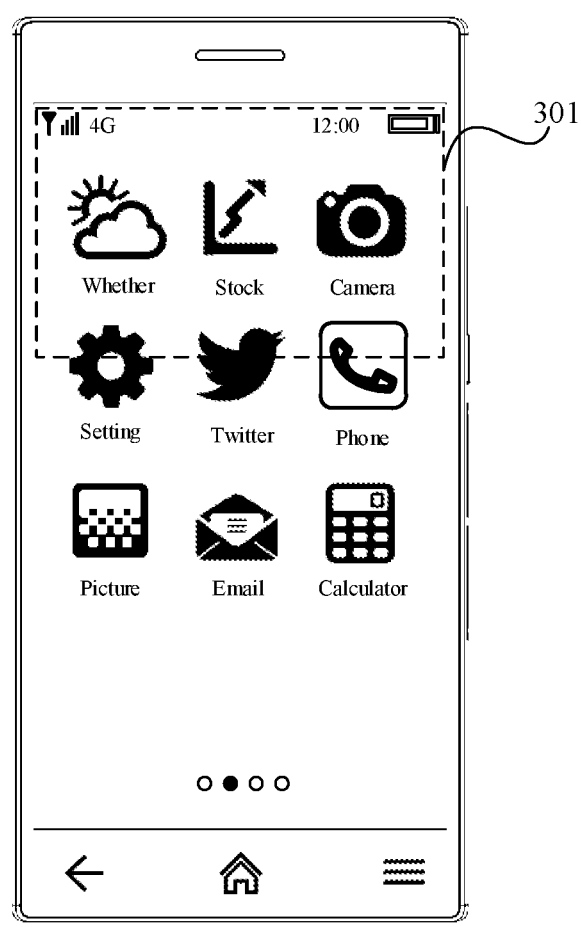
Figure 3C:
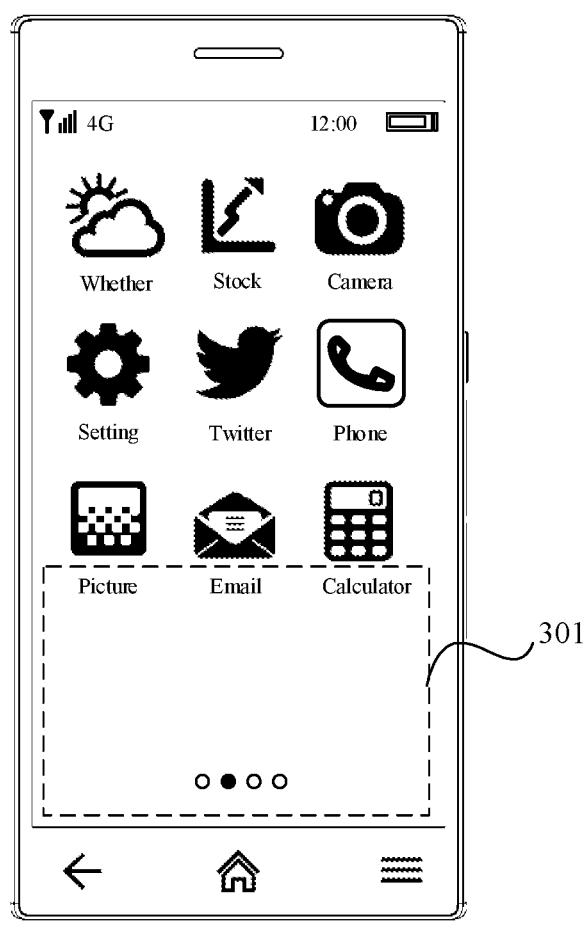
Figure 3D:
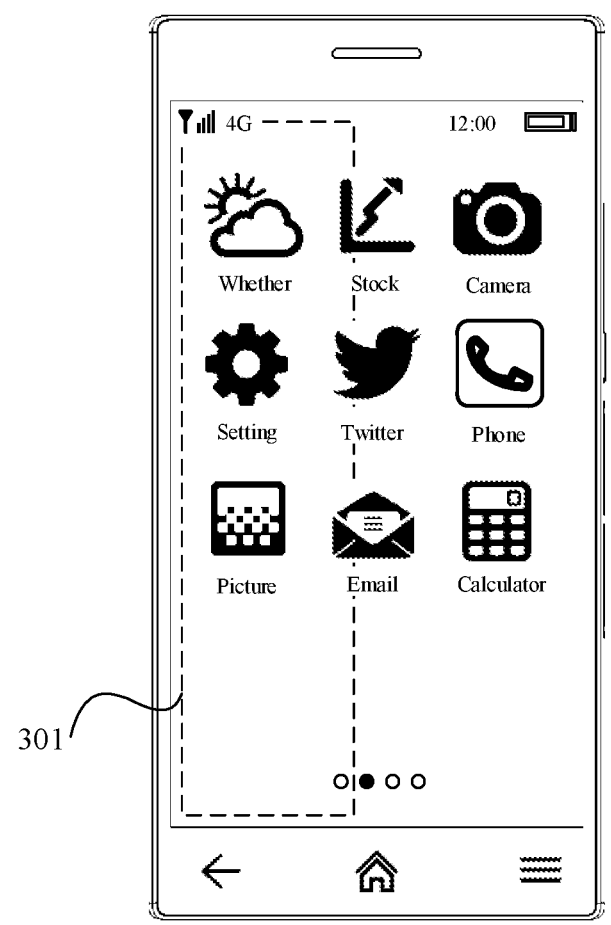
Figure 3E:
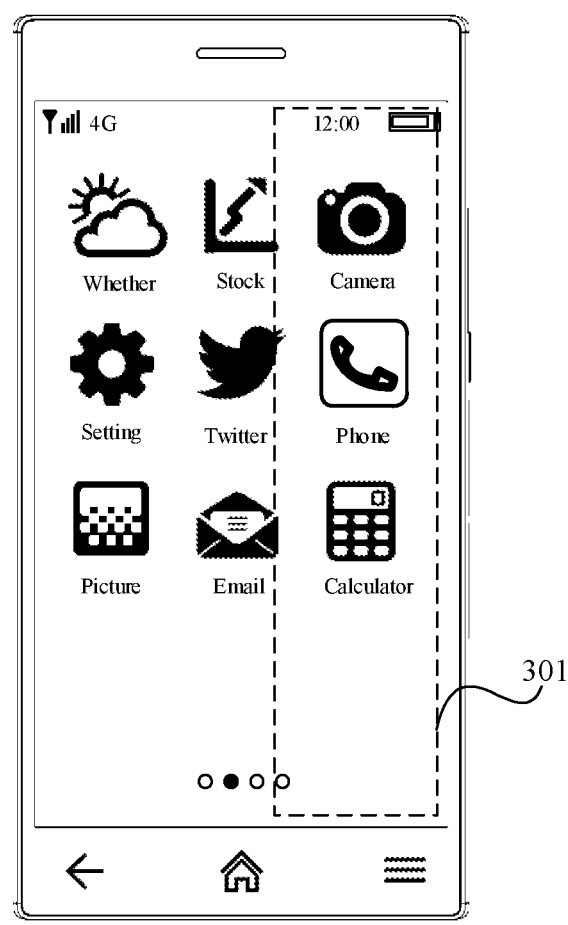
Figure 4A:
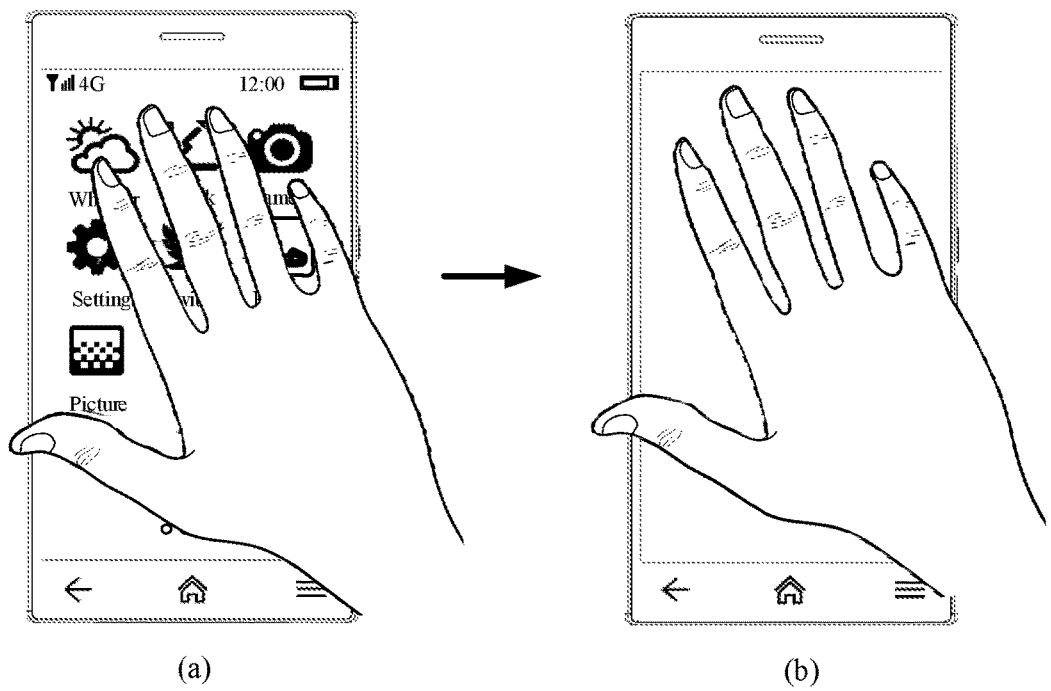
FIG. 4A to FIG. 4E are schematic diagrams of controlling a screen according to an embodiment of the present invention.
Figure 4B:
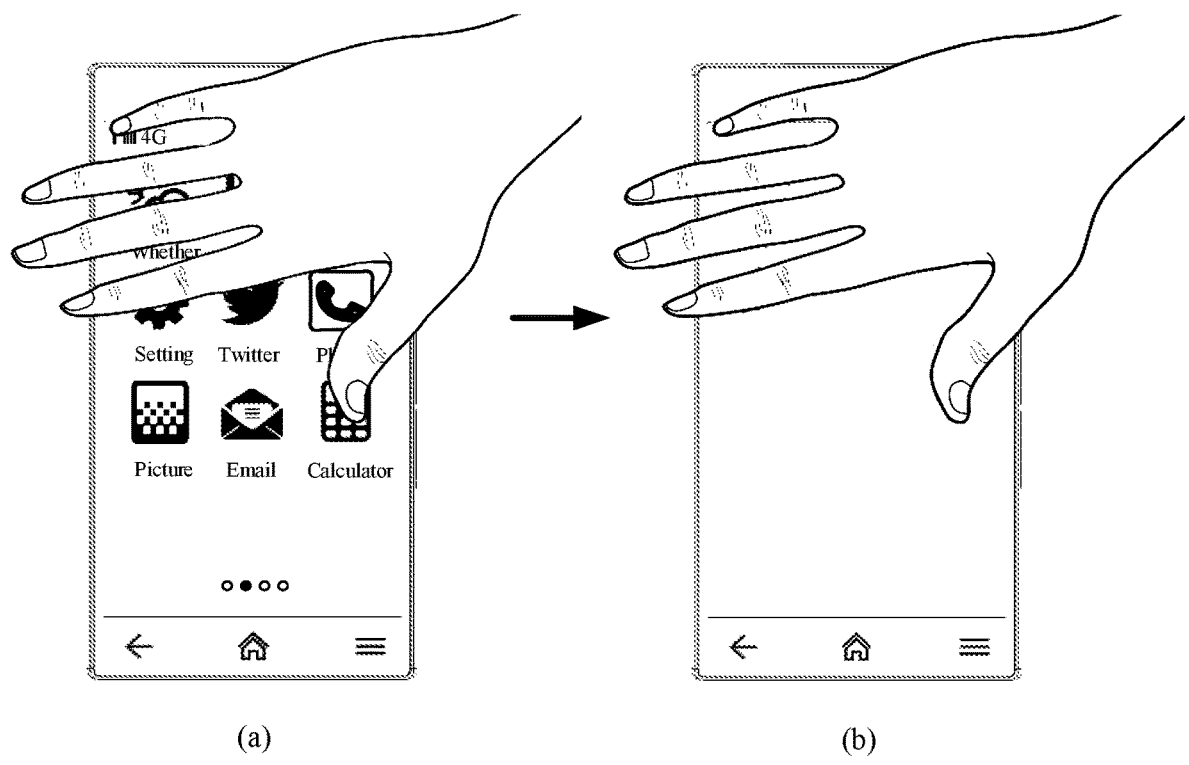
Figure 4C:
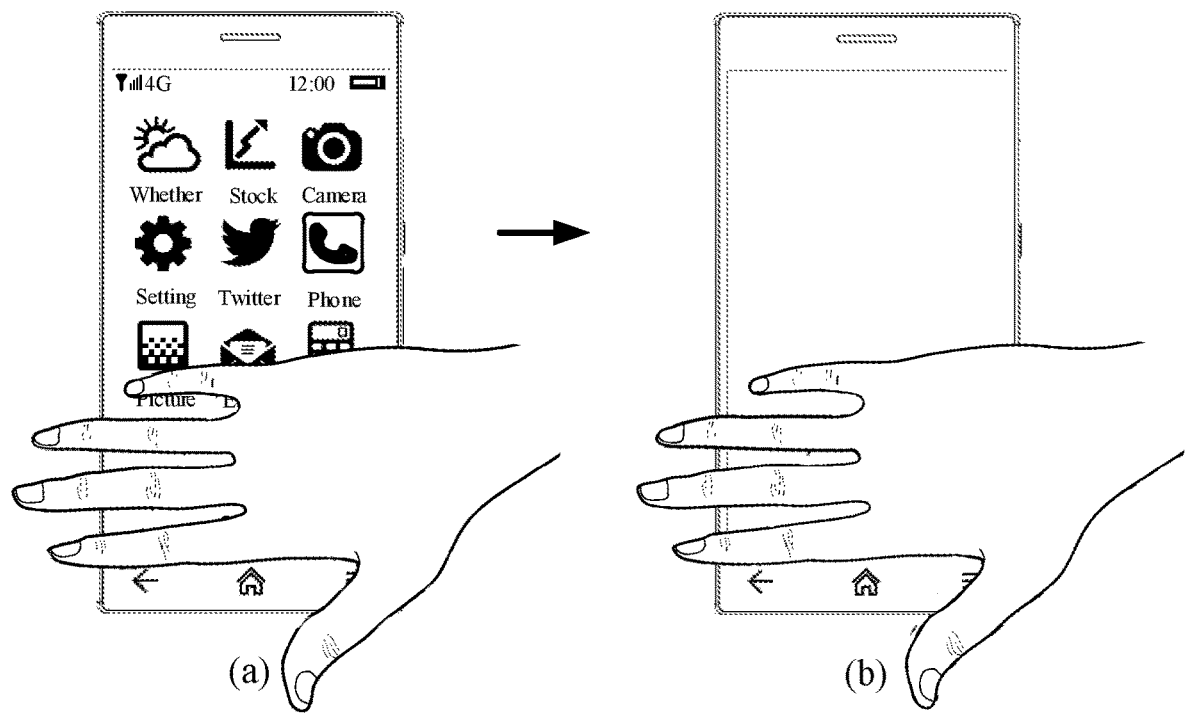
Figure 4D:
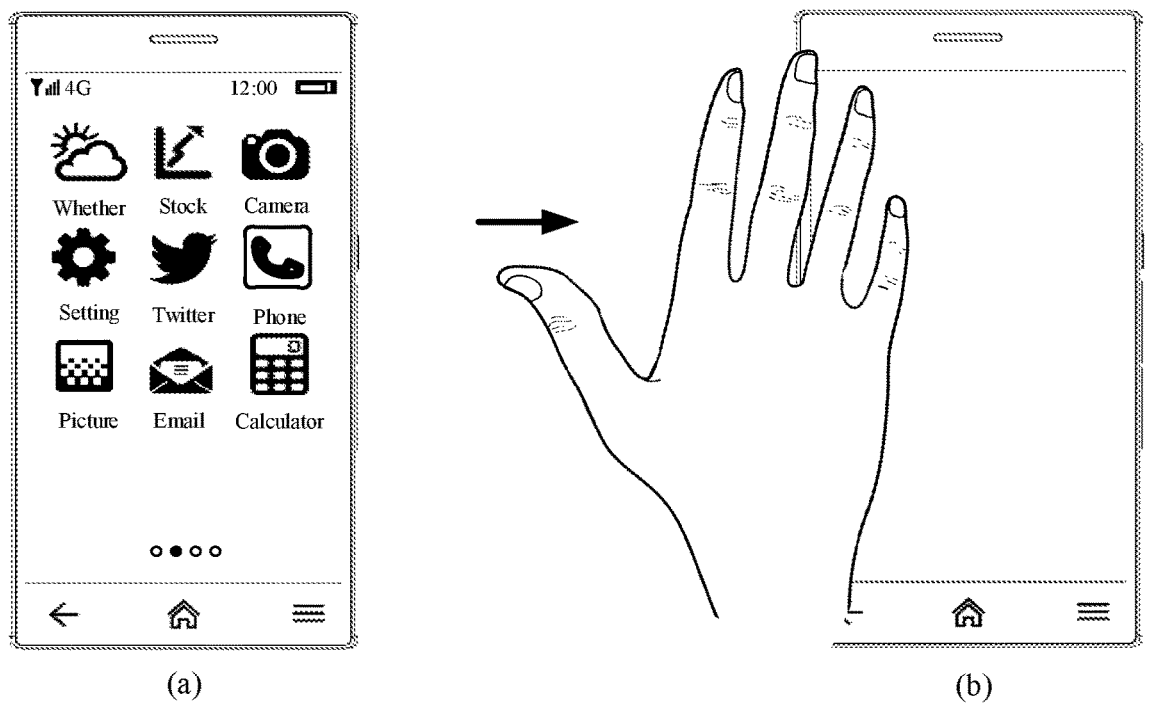
Figure 4E:
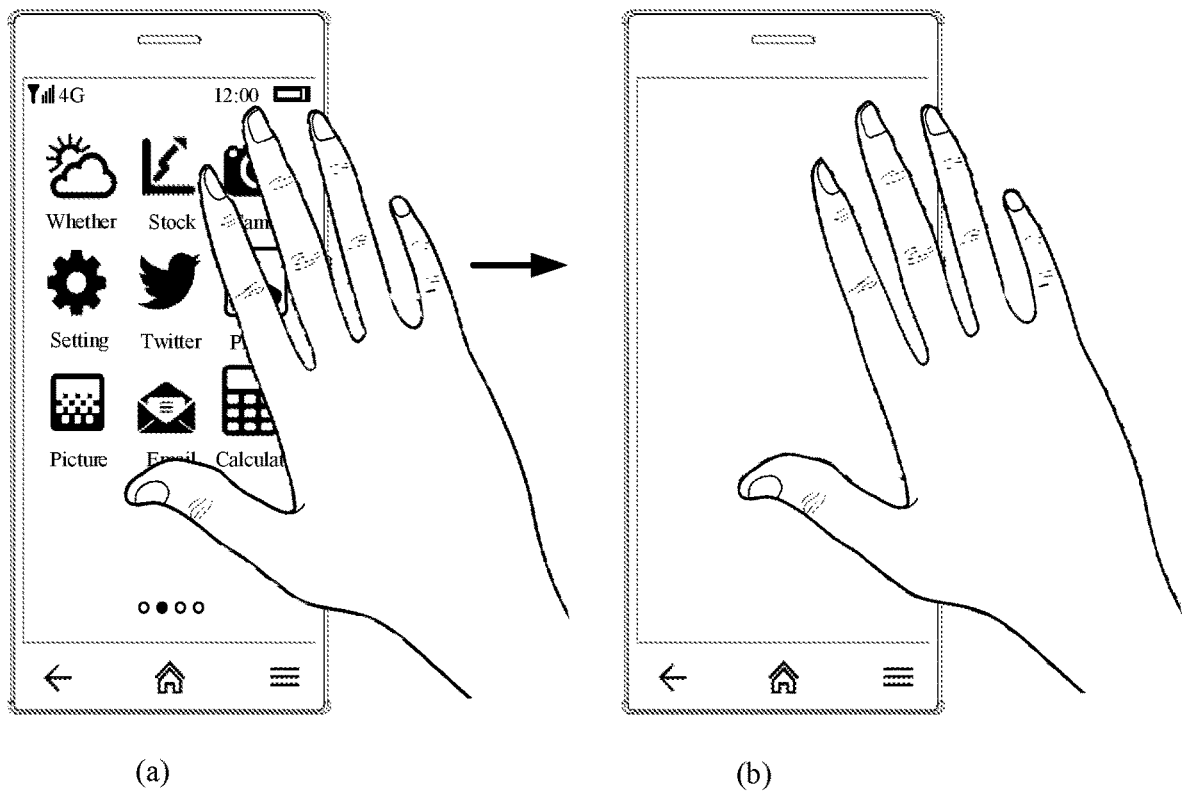

As shown in FIG. 4A, when the preset area is in a middle position of the touchscreen (as shown in FIG. 3A), the user may touch the middle position of the touchscreen (as shown in part (a) in FIG. 4A) with an entire hand. If texture information detected by the terminal does not match the preset texture information, and a touch position corresponding to the touch operation is in the preset area, the terminal turns off the touchscreen (for example, part (b) in FIG. 4A). As shown in FIG. 4B, when the preset area is at the upper part of the touchscreen (as shown in FIG. 3B), the user may touch the upper part of the touchscreen (as shown in part (a) in FIG. 4B) with a hand. If texture information detected by the terminal does not match the preset texture information, and at least one part of touch positions corresponding to the touch operation are in the preset area, the terminal turns off the touchscreen (for example, part (b) in FIG. 4B). In this embodiment of the present invention, the hand of the user is not required to touch only the preset area, but the terminal may turn off the touchscreen as long as the terminal detects texture information that does not match the preset texture information in the preset area, no matter whether other texture information is detected outside the preset area. Similarly, as shown in FIG. 4C, the preset area is at a lower part of the touchscreen (as shown in FIG. 3C). The user may touch the lower part of the touchscreen (for example, part (a) in FIG. 4C) with a hand. When the terminal detects texture information that does not match the preset texture information in the preset area, the touchscreen is turned off (for example, part (b) in FIG. 4C). As shown in FIG. 4D, the preset area is on a left part of the touchscreen (as shown in FIG. 3D). When a hand of the user touches the left part of the touchscreen (for example, part (a) in FIG. 4D), the terminal turns off the touchscreen (for example, part (b) in FIG. 4D). As shown in FIG. 4E, the preset area is on a right part of the touchscreen (as shown in FIG. 3E). When a hand of a user touches the preset area on the right part of the touchscreen (as shown in part (a) in FIG. 4E), the terminal turns off the touchscreen (as shown in part (b) in FIG. 4E).

It should be noted that, when the texture information matches the preset texture information, or when the touch positions are all outside the preset area, the terminal does not turn off the touchscreen, and the terminal may respond to the touch operation and perform a corresponding action, for example, enable a corresponding application or perform a corresponding function.

When the touch information includes the touch area, operation 203 may include operation 2032.

Operation 2032: When the texture information does not match preset texture information, and the touch area is greater than or equal to a preset threshold, the terminal turns off the touchscreen.

For the mismatch between the texture information and the preset texture information, refer to the description in operation 2032. The preset threshold may be preset on the terminal, and after the terminal obtains a touch area of the first touch operation, the terminal compares the touch area with the preset threshold. When detecting that texture information of the first touch operation does not match the preset texture information, and the touch area is greater than or equal to the preset threshold, the terminal may turn off the touchscreen. In one embodiment, when the user wants to turn off the touchscreen, a relatively large area of a body part that is different from a body part whose fingerprint is pre-enrolled may be used to touch the touchscreen. When operating a mobile phone by using a touchscreen, the user usually uses one or two fingertips. Therefore, the preset threshold may be set, according to an empirical value, to be a contact area greater than a contact area during a common operation of the user. For example, the preset threshold may be set to be an area of two or three fingers, or an area of a part or all of a palm.

It should be noted that, when the texture information matches the preset texture information, or when the touch area is less than the preset threshold, the terminal does not turn off the touchscreen, and the terminal may respond to the touch operation and perform a corresponding action, for example, enable a corresponding application or perform a corresponding function.

When the touch information includes the touch position and the touch area, operation 203 may include operation 2033.

Operation 2033: When the texture information does not match preset texture information, at least one part of the touch position is in a preset area, and the touch area is greater than or equal to a preset threshold, the terminal turns off the touchscreen. In this manner, the terminal may consider all of three factors: texture information, a touch position, and a touch area. For a specific process, refer to the description in the foregoing operation 2031 and operation 2032. When the texture information matches the preset texture information, or when all the touch positions are outside of the preset area, or when the touch area is less than the preset threshold, the terminal does not turn off the touchscreen, and the terminal may respond to the touch operation and perform a corresponding action.

According to the method provided in this embodiment of the present invention, a user may quickly lock a screen of a terminal in a simple and convenient manner. For example, when the terminal receives a notification, or when the terminal is playing a video, or when the terminal is in another screen-on state, the user does not need to press any physical button, the screen of the terminal can be turned off only by covering a palm on the screen of the terminal.

Figure 5:
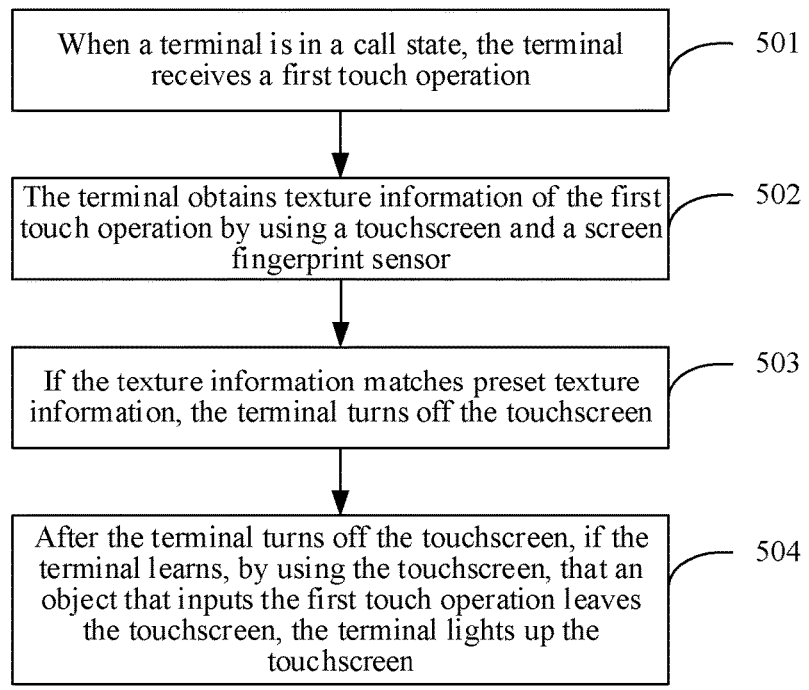
FIG. 5 is a flowchart of another screen control method according to an embodiment of the present invention.

FIG. 5 is a flowchart of another screen control method according to an embodiment of the present invention. The method is applied to a terminal that has a touchscreen, and the terminal includes a screen fingerprint sensor. The method includes the following operations.

Operation 501: When the terminal is in a call state, the terminal receives a first touch operation.

The user may use the terminal to make a call with another terminal, and the call may be, for example, a common voice call using a circuit switched (CS for short) network, or may be a voice call using a packet switch (PS for short) network. That the terminal is in a call state may include a plurality of states: a state in which the terminal dials a called number and a call is not connected; and a state in which the terminal, as a called party or a calling party, has established a call connection to a peer end.

Figure 6:
FIG. 6 is a schematic diagram of a call according to an embodiment of the present invention.

When the user holds the terminal to make a call, the user may place the terminal near an ear. As shown in FIG. 6, when the terminal is placed near an ear, an ear or a face of a user may touch a screen of the terminal. Therefore, the terminal may receive a first touch operation input by the ear or the face of the user.

Operation 502: The terminal obtains texture information of the first touch operation by using the touchscreen and the screen fingerprint sensor. The texture information is skin texture information corresponding to the first touch operation.

The texture information may be ear texture information, or may be face texture information. Alternatively, one part of the texture information may be ear texture information, and the other part of the texture information is face texture information.

Operation 503: If the texture information matches preset texture information, the terminal turns off the touchscreen.

The terminal may pre-store the ear texture information and the face texture information. The texture information may include but is not limited to: a texture, a shape, and a size. The pre-stored texture information may be actively input by the user, or may be universal texture information that is preset before the terminal leaves a factory or that is downloaded from a network side.

The terminal compares the obtained texture information with the preset texture information, and when the obtained texture information is the same as the preset texture information, or similarity between the obtained texture information and the preset texture information is higher than a preset value, it is considered that the obtained texture information matches the preset texture information. Therefore, the terminal turns off the touchscreen, to save power and prevent a false touch on the touchscreen. If the obtained texture information is different from the preset texture information, or similarity between the obtained texture information and the preset texture information is less than a preset value, it is considered that the obtained texture information does not match the preset texture information, and the terminal does not turn off the touchscreen.

After operation 503, the method may further include operation 504.

Operation 504: After the terminal turns off the touchscreen, if the terminal learns, by using the touchscreen, that an object that inputs the first touch operation leaves the touchscreen, the terminal lights up the touchscreen.

In a process in which the user performs a call by using the terminal, the user may remove the terminal from an ear to perform some operations. Therefore, after the touchscreen is turned off in step 503, when the terminal detects, by using the touchscreen, that an ear or a face leaves the touchscreen, the touchscreen may be lighted up, so that the user may perform an input operation by using the touchscreen.

In one embodiment of the present invention, the terminal presets ear and face data. During a call, if a face or an ear of a user touches the screen, the terminal may immediately turn off the screen after screen fingerprint recognition, and automatically light up the screen after the ear and the face leave the screen. In this way, a technology in the prior art in which an optical proximity sensor is used to automatically light up and turn off a screen can be replaced, so that a terminal can delete the optical proximity sensors.

Figure 7:
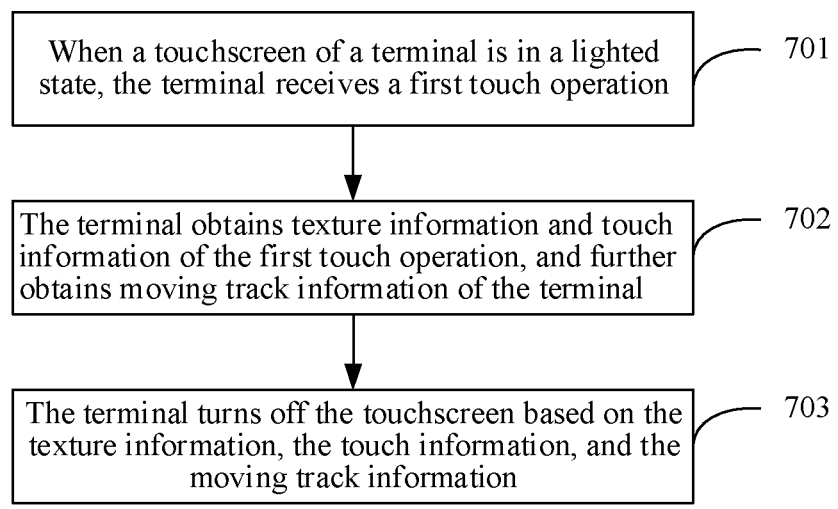
FIG. 7 is a schematic diagram of another screen control method according to an embodiment of the present invention.

FIG. 7 is a schematic diagram of another screen control method according to an embodiment of the present invention. As shown in FIG. 7, the method includes the following operations.

Operation 701: When the touchscreen is in a lighted state, the terminal receives a first touch operation.

For this operation, refer to operation 201 in the embodiment shown in FIG. 2.

Operation 702: The terminal obtains texture information and touch information of the first touch operation, and further obtains moving track information of the terminal.

For a process of obtaining the texture information and the touch information of the first touch operation, refer to operation 202 in the embodiment shown in FIG. 2. It should be noted that, in addition to the touch position and the touch area, the touch information may further include a touch duration. In addition, the terminal may include a sensing device such as a gyroscope or an acceleration sensor. The terminal may further obtain the moving track information of the terminal by using the sensing device.

Operation 703: The terminal turns off the touchscreen based on the texture information, the touch information, and the moving track information. Specifically, operation 703 may include but is not limited to the following cases.

Case 1: When the texture information does not match preset texture information, at least one part of the touch position is in a preset area, and the moving track information indicates that the terminal is put down, the terminal turns off the touchscreen. Otherwise, the terminal does not turn off the touchscreen.

Case 2: When the texture information does not match preset texture information, the touch area is greater than or equal to a preset threshold, and the moving track information indicates that the mobile phone is put down, the terminal turns off the touchscreen. Otherwise, the terminal does not turn off the touchscreen.

Case 3: When the texture information does not match preset texture information, at least one part of the touch position is in a preset area, the touch area is greater than or equal to a preset threshold, and the moving track information indicates that the mobile phone is put down, the terminal turns off the touchscreen. Otherwise, the terminal does not turn off the touchscreen.

Case 4: When the texture information does not match preset texture information, the touch duration is greater than or equal to a preset time period, and the moving track information indicates that the mobile phone is put down, the terminal turns off the touchscreen. Otherwise, the terminal does not turn off the touchscreen.

When using a terminal that has fingerprint recognition inside a screen, a user may enroll fingerprints of finger tips, that usually operate a touchscreen, of thumbs and index fingers both of a left hand and a right hand into the terminal, and use the fingerprints as fingerprints for identity verification. According to the method in this embodiment, when a user is ready to put a mobile phone into a pocket or a bag after using the mobile phone, the screen does not need to be turned off by pressing a power button, and the user only needs to naturally pick up the mobile phone and put the mobile phone into the pocket or the bag. In this case, a non-thumb or a fingertip of an index finger usually touches the screen. Usually, finger stomachs of a thrum and an index finger, a palm, and another finger touch a touchscreen to reach a specific area, or a specific touch duration, or a specific touch position, and in combination with an action of putting down the mobile phone, the terminal may automatically turn off the screen, so that the user can turn off the screen without pressing the power button.

Figure 8:
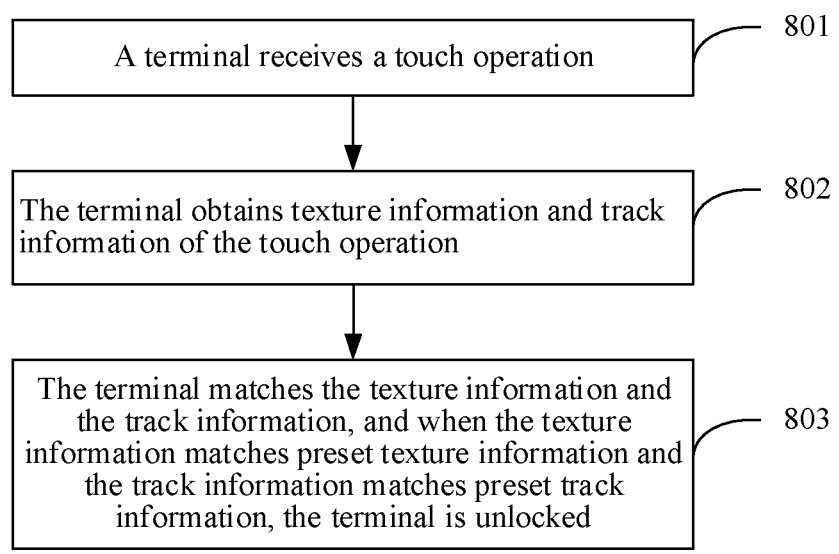
FIG. 8 is a schematic diagram of a method for unlocking a terminal according to an embodiment of the present invention.

FIG. 8 is a schematic diagram of a method for unlocking a terminal according to an embodiment of the present invention. As shown in FIG. 8, the method includes the following operations.

Operation 801: The terminal receives a touch operation.

Operation 802: The terminal obtains texture information and track information of the touch operation.

Operation 803: The terminal performs matching between the texture information and the track information, and when the texture information matches preset texture information and the track information matches preset track information, the terminal is unlocked.

A user may customize skin texture data to be enrolled into the terminal, and may also customize a gesture pattern to be enrolled for unlocking. According to the method in this embodiment, a user draws a customized pattern on a screen of a terminal by using a specific finger, and then the terminal may be unlocked.

In the prior art, when a mobile phone is unlocked only by using a home key or a fingerprint key, a false touch may occur. In this embodiment, on a basis of fingerprint verification, a gesture for a verification touch is added, so that a false touch can be reduced and security can be improved. A false unlocking event is difficult to be triggered when the screen is screen-off. In addition, when the terminal is screen-off, only a part of area on the screen may be steady on, and a user may perform an input operation in the area that is steady on, to unlock the terminal. Alternatively, the terminal may also be completely screen-off, and the terminal is unlocked when the skin texture data that meets an unlocking condition is recognized and the texture data draws a stroke or a shape that meets the condition.

An embodiment of the present invention further provides some terminal control methods. According to this embodiment, a user may pre-enroll skin texture data into the terminal, and then based on the pre-enrolled data, the user may quickly open a private account, quickly open a private file, or quickly enter different function modes.

In one embodiment, a method for quickly opening the private account may include: A specific application (for example, an application A) in the terminal has two accounts (an account 1 and an account 2), and the user may pre-enroll, into the terminal, a fingerprint of a finger that is dedicated to opening the account 2. When the terminal receives that a fingerprint of the finger touches the application A, the terminal enters an interface of an account 2 of the application A; and when the terminal receives that another fingerprint touches the application A, the terminal enters an interface of the account 1 of the user A. Therefore, the account 2 may be used as a private account that can be opened only by a specific user. For example, WeChat with two different accounts is installed in a mobile phone, but the mobile phone may display only one WeChat icon, and the user may open different WeChat accounts by using different fingers.

In one embodiment, a method for quickly opening the private file may include: The user may pre-enroll, into the terminal, a fingerprint that is dedicated to opening a private file of a specific application (for example, an application A). After the application A is opened, when the terminal detects a touch request for viewing the privacy file, the terminal determines whether a fingerprint of the touch request matches a pre-enrolled fingerprint, and if the fingerprint matches the pre-enrolled fingerprint, the privacy file is displayed. There are many private photos, videos, or other files in a gallery or folder of the terminal. These private files can be quickly opened by using the method.

In one embodiment, a method for quickly entering the different function modes may include: A specific application (for example, an application A) in the terminal further has an advanced function mode in addition to a common function mode, where the advanced function mode has more functions than the common function mode. The user may pre-enroll, into a terminal, a fingerprint of a finger that is dedicated to opening the advanced function mode. When the terminal receives that a fingerprint of the finger touches the application A, the terminal enters the application A, and the advanced function mode is displayed. When the terminal receives that another fingerprint touches the application A, the terminal enters the application A, and only the common function mode is displayed. Correspondingly, the user may also pre-enroll a fingerprint that is dedicated to opening a low-level function mode in the terminal. In the prior art, a menu of an application includes all function options of the application, but a probability that some advanced functions are used is relatively low. Therefore, a user may preset a mobile phone fingerprint dedicated to opening a common function or an advanced function. It helps the user view only a basic setting option, or helps the user easily select an advanced option, to meet different user requirements.

An embodiment of the present invention further provides a screen control apparatus included in a terminal. The screen control apparatus includes: an input unit, an obtaining unit, and a control unit.

The input unit is configured to: when a screen of the terminal is in a lighted state, receive a first touch operation. The input unit may be equivalent to the foregoing touchscreen.

The obtaining unit is configured to obtain texture information and touch information of the first touch operation, where the texture information is skin texture information corresponding to the first touch operation, and the touch information includes at least one of a touch position and a touch area. The obtaining unit may be equivalent to the foregoing screen fingerprint sensor, or equivalent to the foregoing screen fingerprint sensor and the foregoing touchscreen.

The control unit is configured to turn off a screen of the terminal based on the texture information and the touch information.

When the touch information includes a touch position, the control unit is specifically configured to: when the texture information does not match preset texture information, and at least one part of the touch position is in a preset area, turn off the screen of the terminal; and the preset area is a part of an area on the screen of the terminal.

When the touch information includes a touch position and a touch area, and the control unit is specifically configured to: when the texture information does not match preset texture information, at least one part of the touch position is in a preset area, and the touch area is greater than or equal to a preset threshold, turn off the screen of the terminal.

When the touch information includes a touch area, and the control unit is specifically configured to: when the texture information does not match preset texture information, and the touch area is greater than or equal to a preset threshold, turn off the screen of the terminal.

The preset area is in a middle position of the screen of the terminal; or the preset area is at an upper part, a lower part, a left part, or a right part of the screen of the terminal. The skin texture information is at least one type of the following information: fingerprint information, palm print information, and finger texture information.

The touch information further includes a touch duration. That the screen of the terminal is in a lighted state is specifically: The screen of the terminal is in a screen-on and unlocked state; or the screen of the terminal is in a screen-on and locked state.

The screen control apparatus provided in this embodiment may be configured to perform the methods provided in the embodiments shown in FIG. 2 to FIG. 4E. For a specific execution process, refer to the foregoing method embodiments.

An embodiment of the present invention further provides a screen control apparatus included in a terminal. The screen control apparatus includes: an input unit, an obtaining unit, and a control unit. The input unit is configured to: when the terminal is in a call state, receive a first touch operation. The obtaining unit is configured to obtain texture information of the first touch operation, where the texture information is skin texture information corresponding to the first touch operation. The control unit is configured to: if the texture information matches preset texture information, turn off the screen of the terminal. The input unit may be equivalent to the foregoing touchscreen. The obtaining unit may be equivalent to the foregoing screen fingerprint sensor, or equivalent to the foregoing screen fingerprint sensor and the foregoing touchscreen.

The skin texture information is at least one type of the following information: ear texture information and face texture information. The ear texture information includes one or more types of the following data: an ear texture, an ear shape, and an ear size. The face texture information includes one or more types of the following data: a face texture, a face shape, and a face size.

Further, the control unit is further configured to: after the screen of the terminal is turned off, if it is learned that an object that inputs the first touch operation leaves the screen of the terminal, light up the screen.

That the terminal is in a call state includes: a state in which the terminal dials a called number and a call is not connected; and a state in which the terminal, as a called party or a calling party, has established a call connection to a peer end.

The screen control apparatus provided in this embodiment may be configured to perform the methods provided in the embodiments shown in FIG. 5. For a specific execution process, refer to the foregoing method embodiments.

By using descriptions of the foregoing embodiments, a person skilled in the art may clearly understand that the present invention may be implemented by hardware, firmware, or a combination thereof. When the present invention is implemented by software, the foregoing functions may be stored in a computer readable medium or transmitted as one or more instructions or code in the computer readable medium. The computer readable medium includes a computer storage medium and a communications medium, where the communications medium includes any medium that turns on a computer program to be transmitted from one place to another. The storage medium may be any available medium accessible to a computer. The following provides an example but does not impose a limitation: The computer readable medium may include a RAM, a ROM, an EEPROM, a CD-ROM, or another optical disc storage or a disk storage medium, or another magnetic storage device, or any other medium that can carry or store expected program code in a form of an instruction or a data structure and can be accessed by a computer. In addition, any connection may be appropriately defined as a computer readable medium. For example, if software is transmitted from a website, a server, or another remote source by using a coaxial cable, an optical fiber/cable, a twisted pair, a digital subscriber line (DSL) or wireless technologies such as infrared ray, radio, and microwave, the coaxial cable, optical fiber/cable, twisted pair, DSL, or wireless technologies such as infrared ray, radio, and microwave are included in fixation of a medium to which they belong. For example, a disk (disk) and disc (disc) used by the present invention includes a compact disc (CD), a laser disc, an optical disc, a digital versatile disc (DVD), a floppy disk and a Blu-ray disc, where the disk usually copies data by a magnetic means, and the disc copies data optically by a laser means. The foregoing combination should also be included in the protection scope of the computer readable medium.

The descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A screen control method, comprising:
   receiving, by a terminal having a touchscreen and a screen fingerprint sensor, a first touch operation when the touchscreen is in a lighted state;
   obtaining, by the terminal, texture information and touch information of the first touch operation by using the touchscreen and the screen fingerprint sensor, wherein the texture information includes skin texture information corresponding to the first touch operation, and the touch information comprises at least one of a touch position or a touch area; and
   turning off, by the terminal, the touchscreen based on the texture information and the touch information when the texture information does not match preset texture information and the touch area is greater than or equal to a preset threshold.

2. The method according to claim 1, wherein turning off the touchscreen based on the texture information and the touch information comprises:
   turning off, by the terminal, the touchscreen when the texture information does not match the preset texture information and at least one part of the touch position is in a preset area;
   wherein the preset area is a part of an area on the touchscreen.

3. The method according to claim 2, wherein
   the preset area is in a middle position of the touchscreen; or
   the preset area is at an upper part, a lower part, a left part, or a right part of the touchscreen.

4. The method according to claim 1, wherein turning off the touchscreen based on the texture information and the touch information comprises:
   when the texture information does not match the preset texture information, at least one part of the touch position is in a preset area, and the touch area is greater than or equal to a preset threshold, turning off, by the terminal, the touchscreen.

5. The method according to claim 1, wherein the skin texture information comprises at least one type of fingerprint information, palm print information, or finger texture information.

6. The method according to claim 1, wherein
the touch information further comprises a touch duration; or
when the touchscreen is in the lighted state, the touchscreen is in a screen-on and unlocked state; or
when the touchscreen is in the lighted state, the touchscreen is in a screen-on and locked state.

7. The method according to claim 4, wherein
the preset area is in a middle position of the touchscreen; or
the preset area is at an upper part, a lower part, a left part, or a right part of the touchscreen.

8. A screen control method, comprising:
receiving, by a terminal having a touchscreen and a screen fingerprint sensor, a first touch operation when the terminal is in a call state;
obtaining, by the terminal, texture information of the first touch operation by using the touchscreen and the screen fingerprint sensor, wherein the texture information includes skin texture information corresponding to the first touch operation; and
turning off, by the terminal, the touchscreen directly responsive to the texture information matches preset texture information.

9. The method according to claim 8, wherein the skin texture information comprises at least one type of ear texture information or face texture information.

10. The method according to claim 9, wherein
the call state comprises: a state in which the terminal dials a called number and a call is not connected or a state in which the terminal, as a called party or a calling party, has established a call connection to a peer end; or
the ear texture information comprises one or more types of an ear texture, an ear shape, and an ear size; or
the face texture information comprises one or more types of a face texture, a face shape, and a face size.

11. The method according to claim 8, wherein after the turning off, by the terminal, the touchscreen, the method further comprises:
if the terminal learns, by using the touchscreen, that an object that inputs the first touch operation leaves the touchscreen, lighting up, by the terminal, the touchscreen.

12. A terminal, comprising:
a touchscreen;
a screen fingerprint sensor, wherein the screen fingerprint sensor is integrated into the touchscreen, or the screen fingerprint sensor is below the touchscreen;
one or more processors; and
one or more memories storing one or more computer programs having an instruction, which when executed by the one or more processors, cause the processors to perform operations, the operations comprising:
receiving a first touch operation by using the touchscreen when the touchscreen is in a lighted state; and
obtaining texture information and touch information of the first touch operation by using the touchscreen and the screen fingerprint sensor, wherein the texture information includes skin texture information corresponding to the first touch operation, and the touch information comprises at least one of a touch position or a touch area; and
turning off the touchscreen based on the texture information and the touch information when the texture information does not match preset texture information and the touch area is greater than or equal to a preset threshold.

13. The terminal according to claim 12, wherein turning off the touchscreen based on the texture information and the touch information comprises:
turning off the touchscreen when the texture information does not match the preset texture information and at least one part of the touch position is in a preset area;
wherein the preset area is a part of an area on the touchscreen.

14. The terminal according to claim 13, wherein
the preset area is in a middle position of the touchscreen; or
the preset area is at an upper part, a lower part, a left part, or a right part of the touchscreen.

15. The terminal according to claim 12, wherein turning off the touchscreen based on the texture information and the touch information comprises:
when the texture information does not match the preset texture information, at least one part of the touch position is in a preset area, and the touch area is greater than or equal to a preset threshold, turning off the touchscreen.

16. The terminal according to claim 15, wherein
the preset area is in a middle position of the touchscreen; or
the preset area is at an upper part, a lower part, a left part, or a right part of the touchscreen.

17. The terminal according to claim 12, wherein the skin texture information comprises at least one type of fingerprint information, palm print information, or finger texture information.

18. The terminal according to claim 12, wherein
the touch information further comprises a touch duration; or
when the touchscreen is in the lighted state, the touchscreen is in a screen-on and unlocked state; or
when the touchscreen is in the lighted state, the touchscreen is in a screen-on and locked state.

* * * * *